(12) United States Patent  
Yamaguchi

(10) Patent No.: US 6,240,255 B1
(45) Date of Patent: May 29, 2001

(54) STROBE DEVICE OF LENS-FITTED FILM UNIT AND PRODUCTION METHOD OF STROBE DEVICE

(75) Inventor: Hiroshi Yamaguchi, Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/386,688

(22) Filed: Aug. 31, 1999

(30) Foreign Application Priority Data

Sep. 4, 1998 (JP) .................................................. 10-267372

(51) Int. Cl.⁷ .................................................. G03B 15/05

(52) U.S. Cl. ................................................ 396/200; 362/3

(58) Field of Search .................................. 396/200, 155; 362/3, 16, 17, 18

(56) References Cited

U.S. PATENT DOCUMENTS 4,317,625 * 3/1982 Van Allen .............................. 396/200

* cited by examiner

Primary Examiner—W. B. Perkey
(74) Attorney, Agent, or Firm—Jordan B. Bierman; Bierman, Muserlian and Lucas

(57) ABSTRACT

A strobe device, including: a reflector, having a reflection surface which reflects a strobe light forwardly; a light emitting tube, having electrodes on its ends and provided inside the reflector, for emitting the strobe light; and a transmission window portion provided in a front of the light emitting tube and through which the strobe light is transmitted; in which the reflector has openings, to mount the light emitting tube from the front of the reflector, on both side portions of the reflector; and the light emitting tube is provided inside the reflector so that the electrode portions of the light emitting tube are positioned outside the openings of the reflector.

20 Claims, 15 Drawing Sheets

STROBE DEVICE OF LENS-FITTED FILM UNIT AND PRODUCTION METHOD OF STROBE DEVICE

BACKGROUND OF THE INVENTION

The present invention relates to a strobe device, a lens-fitted film unit with the strobe device, and a production method of the strobe device.

Conventionally, a lens-fitted film unit on which a strobe device is equipped, is put to practical use. An outline structure of the strobe device of such the lens-fitted film unit is shown in FIG. 14.

A light emitting section of the conventional strobe device shown in FIG. 14 has: a strobe holding body 101 which has an opening portion on the front side, an accommodating portion in its inside portion, and a insertion hole 101a on its side wall; a reflector 102 which is provided with a reflecting surface to reflect the strobe light forward, and a hole 103 for inserting a light emitting tube 105 having an electrode 105a on a side portion; and a transmission window portion 104 made of a transparent material through which the strobe light is transmitted, the transmission window portion 104 being provided onto the strobe holding body 101 so as to cover the front of the reflector 102.

In a production method of the strobe device, the following production process is adopted: after the reflector 102 has been accommodated in the strobe holding body 101, the light emitting tube 105 is laterally inserted into the strobe holding body 101 via the insertion hole 101a, the hole portion 103, and after the tube is fixed, the opening portion of the strobe holding body 101 is covered by the transmission window portion 104.

However, in the case of the conventional strobe device described above, when the light emitting tube 105 is inserted into the strobe holding body 101, because the light emitting tube 105 is inserted laterally, not from the front surface side of the strobe holding body 101, but from the lateral direction whose angle is different by 90° from the front surface side, in the production process of the strobe device, only an assembling process of the light emitting tube 105 is different from other processes, which results in inferior assembling property of the strobe device, therefore the mass productivity is not increased, which is a problem.

SUMMARY OF THE INVENTION

The present invention is attained in view of the foregoing conditions, and the object of the present invention is to provide a strobe device which has excellent assembling property and is appropriate for mass production, and a strobe device of a lens-fitted film unit by which assembling property and mass productivity can be increased, and a production method of the strobe device.

(1) In an example of a strobe device of the present invention, a strobe device has: a reflector having a reflection surface which reflects a strobe light forwardly; a light emitting tube to emit the strobe light which has electrodes on both ends and is provided inside the reflector; and a transmission window portion which is provided in the front of the light emitting tube and through which the strobe light is transmitted, in which the reflector has openings, to mount the light emitting tube from the front of the reflector, on both side portions, and the light emitting tube is provided inside the reflector under the condition that the electrode portions of the light emitting tube are positioned outside the openings of the reflector.

(2) In another example of a strobe device of the present invention, the strobe device has: a strobe holding body having an opening portion on the front side and receiver portions whose side surface portions are opened toward the front; a reflector which has a reflection surface to reflect the strobe light forwardly, and openings on both side portions, and which is provided inside the strobe holding body; a light emitting tube to emits the strobe light which has electrode portions on both ends, and which is provided inside the reflector under the condition that the electrode portions of the light emitting tube are positioned outside the openings of the reflector and the receiver portions of the strobe holding body; and a transmission window portion through which the strobe light is transmitted, and which is provided on the opening portion of the strobe holding body.

According to these examples, because all of the reflector, light emitting tube, and transmission window portion can mount to the strobe holding body from the front surface side of its opening portion in the same mounting direction, a strobe device in which assembling property is good, and which is appropriate for mass production can be provided.

(3) In an example of a production method in the strobe device of the present invention, the production method has a step in which the light emitting tube to emit the strobe light which has electrode portions on both ends, is mounted inside the reflector having the reflection surface to reflect the strobe light forward, and having opening portions on both side portions, from the front of the reflector, and a step to mount the transmission window portion through which the strobe light is transmitted, on the front surface of the reflector, and the light emitting tube is mounted inside the reflector under the condition that the electrode portions of the light emitting tube are positioned outside the openings of the reflector.

According to the example of this production method, because all of a mounting process of the reflector into the strobe holding body, a mounting process of the light emitting tube into the strobe holding body, and a process to mount the transmission window portion on the opening portion of the strobe holding body, can be performed from the front surface side of the opening portion in the same direction, thereby, the production method by which the assembling property and the mass productivity of the strobe device can be increased, can be provided.

(4) Further, in still another example in the strobe device of the above-described Item (1), a strobe device has a strobe holding body which has the opening portion to mount the reflector from the front of the strobe holding body, and the receiver portions whose side surface portions are opened toward the front to mount the light emitting tube from the front; the reflector is provided inside the strobe holding body; the light emitting tube is provided inside the reflector under the condition that the electrode portions of the light emitting tube are positioned outside the openings of the reflector and the strobe holding body, and the dimension of the outer rim of the enlargement-opened portion of the front surface is larger than the inner rim of the opening portion of the strobe holding body when the reflector is not provide in the strobe holding body, and the reflector is provided inside the strobe holding body under the condition that the reflector is bent.

(5) Further, in another example of the strobe device in above-described Item (2), when the reflector is not provided in the strobe holding body, the dimension of the outer rim of the enlargement-opened portion of the front surface is larger than the inner rim of the opening portion of the strobe holding body, and the reflector is provided inside the strobe holding body under the condition that the reflector is bent.

(6) Further, in another example of the production method of the strobe device in the above-described Item (3), the production method comprises: a step in which the reflector is mounted inside the strobe holding body having the opening portion in the front surface, and receiver portions whose side surface portions are opened toward the front, from the front of the strobe holding body; a step in which the light emitting tube is mounted inside the reflector from the front of the reflector; a step in which a side plate having a recessed portion to cover at least a portion of the opening portion of the strobe holding body is mounted from the front of the strobe holding body; and a step in which the transmission window portion is provided in the opening portion of the strobe holding body, and in the production method, the light emitting tube is provided inside the reflector under the condition that the electrode portions of the light emitting tube are positioned outside the opening portions of the reflector and the receiver portions of the strobe holding body, the transmission window portion is provided in the opening portion of the strobe holding body, the light emitting tube is mounted in the reflector from the front of the reflector through the openings of the reflector and the receiver portions of the strobe holding body, and the light emitting tube is provided inside the reflector under the condition that the electrode portions of the light emitting tube are positioned outside the recessed portions of the side plates.

According to these examples, because the reflector is accommodated in the accommodating portion of the strobe holding body under the condition that the enlargement-opened portion of the reflector is bent, the reflector mounting condition onto the strobe holding body is strengthened due to the stress caused on the reflector.

(7) Further, in another example of the strobe device described in the Item (4), the openings of the reflector have a slit groove and an electrode exposure opening portion, and when the reflector is provided inside the strobe holding body under the condition that the reflector is bent, the slit groove is closed, and the light emitting tube is provided inside the reflector under the condition that the electrode portion is positioned outside the electrode exposure opening portion of the reflector and the receiver portion of the strobe holding body.

(8) Further, in another example of the strobe device described in the Item (2), the opening portion of the reflector has a slit groove and an electrode exposure opening portion, and when the reflector is provided inside the strobe holding body under the condition that the reflector is bent, the slit groove is closed, and the light emitting tube is provided inside the reflector under the condition that the electrode portion is positioned outside the electrode exposure opening portion of the reflector and the receiver portion of the strobe holding body.

According to these examples, a housing operation of the reflector into the strobe holding body can be carried out by pushing the reflector into the accommodating portion of the strobe holding body while the enlargement-opened portion of the reflector is being bent by using a tool or the like, thereby, the operation process can be simplified.

Further, examples in the following (9)through (14) are also according to examples of the present invention.

(9) In a strobe device of the lens-fitted film unit, a strobe device of the lens-fitted film unit characterized in that the strobe device has a light emitting portion provided with: the strobe holding body having the opening portion on the front surface side, in which an accommodating portion is provide in the inside, and the receiver portions whose front surface side are opened, are formed in both side wall portions of the accommodating portion; a reflector which has the reflection surface to reflect the strobe light forward, and a slit groove and an electrode exposure opening portion are formed at positions respectively corresponding to the receiver portions on both side portions, and which is accommodated in the accommodating portion from the front surface side of the strobe holding body; the light emitting tube to emit the strobe light, which has the electrode portions on the both ends, and is mounted from the front surface side of the reflector into the accommodating portion of the strobe holding body under the condition that the electrode portion faces to the electrode exposure opening portion via the slit groove, and whose both end portions are engaged with the receiver portions; and the transmission window portion through which the strobe light is transmitted, and which is mounted on the opening portion of the strobe holding body under the condition that the front of the light emitting tube is covered.

(10) A production method of the strobe device of the lens-fitted film unit characterized in that the production method has: a process in which a reflector which has the reflection surface to reflect the strobe light forward, and a slit groove and an electrode exposure opening portion are formed at positions respectively corresponding to the receiver portions on both side portions, is inserted into the strobe holding body having the opening portion on the front surface side, in which an accommodating portion is provide in the inside, and the receiver portions whose front side are opened, are formed in both side wall portions of the accommodating portion, from the front surface side of the strobe holding body; a process in which the light emitting tube to emit the strobe light, which has the electrode portions on the both ends, and is mounted from the front surface side of the reflector into the accommodating portion of the strobe holding body under the condition that the electrode portion faces to the electrode exposure opening portion via the slit groove, and whose both end portions are engaged with the receiver portions; and a process in which the transmission window portion through which the strobe light is transmitted, is mounted on the opening portion of the strobe holding body under the condition that the front of the light emitting tube is covered.

(11) In a strobe device of the lens-fitted film unit, a strobe device of the lens-fitted film unit characterized in that the strobe device has a light emitting portion provided with: the strobe holding body having the opening portion on the front surface side, in which an accommodating portion is provide in the inside, and the receiver portions whose front surface side are opened, are formed in both side wall portions of the accommodating portion; a reflector which has a reflection portion which forms a parabolic reflection surface to reflect the strobe light forward, and has an enlargement-opened portion whose dimension is larger than an opening rim of the strobe holding body, on the opening side, and both side portions in which a slit groove and an electrode exposure opening portion are formed at positions respectively corresponding to the receiver portions, and which is accommodated in the accommodating portion of the strobe holding body under the condition that the enlargement-opened portion is bent; the light emitting tube to emit the strobe light, which has the electrode portions on the both ends, and is mounted from the front surface side of the reflector into the accommodating portion of the strobe holding body together with the reflector under the condition that the electrode portion faces to the electrode exposure opening portion via the slit groove, and whose both end portions are engaged with the receiver portions; and the transmission window portion through which the strobe light is transmitted, which is mounted on the opening portion of the strobe holding body under the condition that the front of the light emitting tube is covered.

(12) A production method of a strobe device of the lens-fitted film unit, characterized in that the production method has: a process in which a light emitting tube to emit the strobe light, is inserted into a reflector which is composed of a reflection portion, which forms a parabolic reflection surface to reflect the strobe light forward, and has an enlargement-opened portion whose dimension is larger than an opening rim of the strobe holding body on the opening side, and both side portions in which a slit groove and an electrode exposure opening portion are formed at positions respectively corresponding to the receiver portions, under the condition that the electrode portions provided on both ends of the light emitting tube face to the electrode exposure opening portion via the slit groove; a process in which the reflector into which the light emitting tube is inserted, is inserted into the accommodating portion of the strobe holding body under the condition that the enlargement-opened portion is bent, from the front surface side of the strobe holding body having the opening portion on the front surface side, in which an accommodating portion is provide in the inside, and the receiver portions whose front surface side are opened, are formed in both side wall portions of the accommodating portion, and both end portions of the light emitting tube are engaged with the receiver portions of the strobe holding body; and a process in which the transmission window portion through which the strobe light is transmitted, is mounted on the opening portion of the strobe holding body under the condition that the front of the light emitting tube is covered.

(13) In a strobe device of the lens-fitted film unit, a strobe device of the lens-fitted film unit characterized in that the strobe device has a light emitting portion provided with: the strobe holding body having the opening portion on the front surface side, in which an accommodating portion is provide in the inside, and the receiver portions whose front surface sides are opened, are formed in both side wall portions of the accommodating portion; a reflector which has the parabolic reflection surface to reflect the strobe light forward, and which is accommodated in the accommodating portion from the front surface side of the strobe holding body; the light emitting tube to emit the strobe light, which has the electrode portions on the both ends, and is mounted from the front surface side of the reflector into the accommodating portion of the strobe holding body, and whose electrode portions are engaged with the receiver portions; a pair of side plates which have recessed grooves to expose the electrode portions of the light emitting tube, and which are inserted into both side portions of the light emitting tube from the front surface side of the strobe holding body; and the transmission window portion through which the strobe light is transmitted, and which is mounted on the opening portion of the strobe holding body under the condition that the front of the light emitting tube is covered.

(14) A production method of a strobe device of the lens-fitted film unit, characterized in that the production method has: a process in which a reflector which forms a parabolic reflection surface to reflect the strobe light forward, is inserted into the accommodating portion from the front surface side of the strobe holding body having the opening portion on the front surface side, in which an accommodating portion is provide in the inside, and the receiver portions whose front surface side are opened, are formed in both side wall portions of the accommodating portion; a process in which the light emitting tube is inserted into the accommodating portion of the strobe holding body from the front surface side of the reflector, and both end portions are engaged with the receiver portions of the strobe holding body; and a process in which a pair of side plates are inserted into the outside of both side portions of the reflector and the inside of the receiver portions, and the electrode portions of the light emitting tube are exposed by the recessed groove.

DETAILED DESCRIPTION OF THE INVENTION

Embodiments of the present invention will be detailed below.

Embodiment 1

FIGS. 1 through 7 show a lens-fitted film unit of Embodiment 1 of the present invention.

This lens-fitted film unit 1 is a simple camera which is put on the market under the condition that photographic film is previously loaded into the camera, and the photographic film is loaded in the camera in the production process of the camera, and therefore, loading and rewinding operations of the photographic film by the photographer are not necessary, and the photographer can perform the photographic operation at once.

Figure 1:
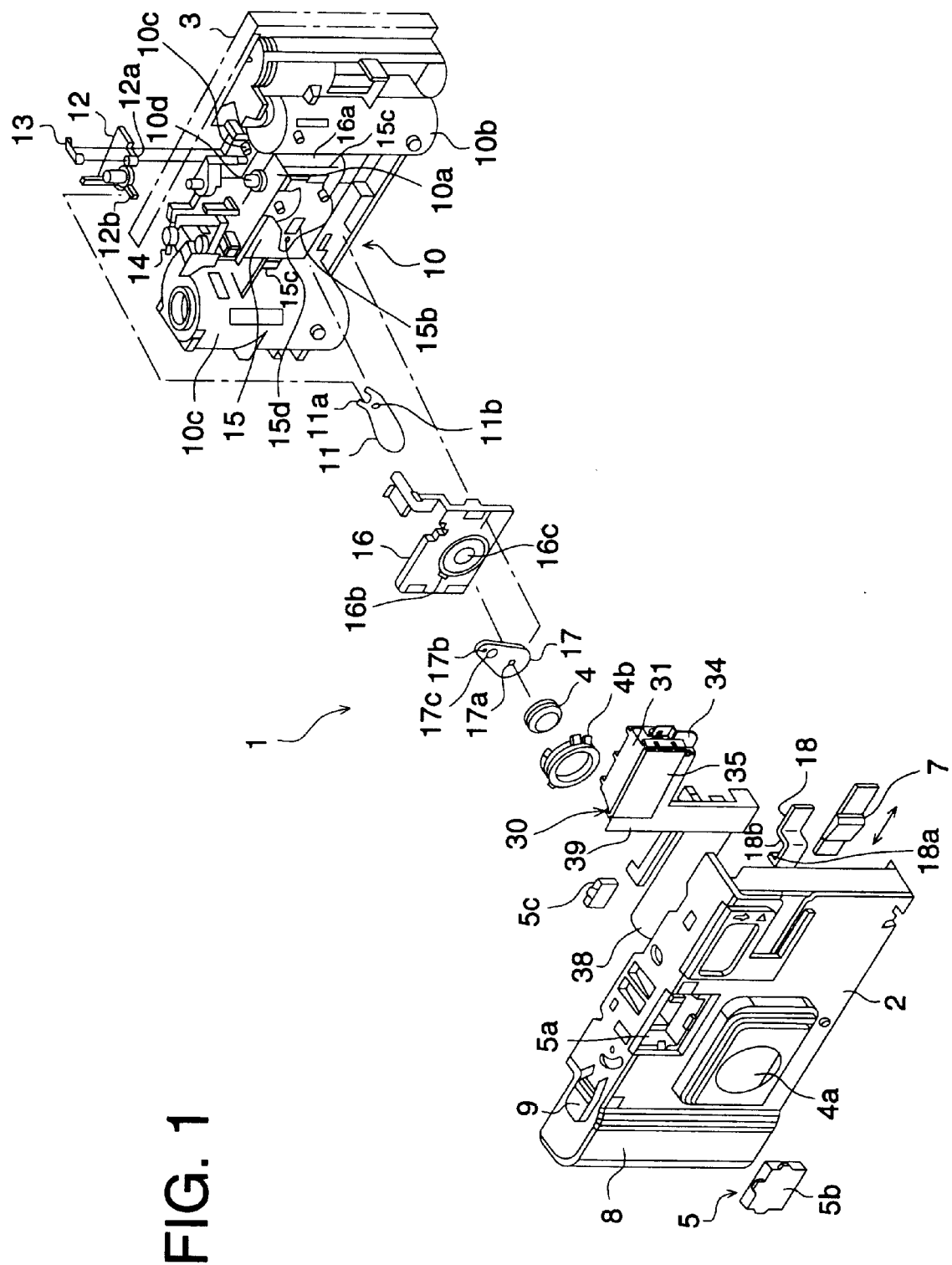
FIG. 1 is an exploded perspective view of a lens-fitted film unit including a strobe device of Embodiment 1 of the present invention.

As shown in FIG. 1, the lens-fitted film unit 1 is structured such that a front cover 2 and a rear cover 3 are assembled together, and a picture-taking lens aperture 4a is provided at the center of the front side of the front cover 2, and a view finder 5 composed of a view finder frame 5a, an objective lens 5b and an ocular eyepiece 5c, is provided at an upper position of the picture-taking lens aperture 4a, and a strobe light emitting window frame 6 is provided in the vicinity of the view finder 5.

A strobe lever switch 7 serving as a switching lever, is provided under the strobe light emitting window frame 6, and the strobe lever switch 7 switches a strobe device 30, which will be described later, into a service condition or an out-of-service condition.

A grip portion 8 is provided on the right side portion of the lens-fitted film unit 1, and a release button 9 is provided on an upper portion of the grip portion 8.

As shown in FIG. 1, a main body 10 is provided in the inside sandwiched between the front cover 2 and the rear cover 3 of the lens-fitted film unit 1.

A picture-taking frame 10a is provided in the center of the main body 10, and a film storage chamber 10b is provided on one side and the a winding-up chamber 10c is provided on the other side, with the picture-taking frame 10a between them.

A boss 10d is provided on an upper portion of the main body 10, and a sector lever 12 to drive a sector 11 is rotatably fitted to the boss 10d. A spring 13 is provided between an engagement portion 12a of the sector lever 12 and a protrusion 10e of the main body 10, and the sector lever 12 is always forced to close by the spring 13.

A boss 12b of the sector lever 12 is engaged with a U-groove 11a of the sector 11, and transmits the movement of the sector lever 12 to the sector 11.

The sector lever 12 is rotated by a release mechanism 14 assembled in the main body 10, and the release mechanism 14 is operated by a release button 9.

A spacer 15 is provided on the front side of the picture-taking frame 10a of the main body 10, and a lens receiver 16 is provided on the front of the spacer 15 by engaging a claw portion 16a with a recessed portion 15a of the spacer 15. An exposure window 15b is formed in the spacer 15, and the sector 11 is arranged between the spacer 15 and the lens receiver 16.

A hole 11b of the sector 11 is inserted by a boss 15c of the spacer 15, and the sector 11 is operated by a sector lever 12 and can release the exposure window 15b.

In the lens receiver 16, the picture-taking lens 4 is assembled in a lens mounting portion 16b, and an exposure aperture 16c is formed on a position corresponding to the picture-taking lens 4.

A diaphragm plate 17 is set on the lens receiver 16. A diaphragm aperture 17a is formed in the diaphragm plate 17, and when a fitting hole 17b formed in the diaphragm plate 17 is engaged with the boss provided on the spacer 15, the diaphragm plate 17 is rotatably supported by the spacer 15.

A long hole 17c is formed on the diaphragm plate 17, and a protruded portion 18a of a slide lever 18 is engaged with the long hole 17c, and further, a stopper portion 18b is formed on the slide lever 18.

Further, a strobe lever switch 7 is engaged with the slide lever 18. In this connection, in FIG. 1, numeral 4b is a lens suppressor.

Referring to FIGS. 2 through 7, the structure of a strobe device 30 and a production method of the strobe device 30 will be detailed here.

As shown in FIGS. 2, 3, 4, 5, 6 and 7, this strobe device 30 has a strobe holding body 31, reflector 32, light emitting tube 33, electric contact piece 34, transmission window portion 35 through which the strobe light is transmitted, and whose sectional shape is formed to be almost C-shape, trigger contact piece 36 arranged on the rear side of the strobe holding body 31, strobe board 37 mounted on a side portion of the strobe holding body 31, capacitor 38 in which electric charges for light emission of the light emitting tube 33 whose one pair of terminals are connected to the strobe board 37, are accumulated, and battery contact pieces 39a and 39b which are respectively connected to positive and negative electrodes of the battery, not shown, fitted on the strobe board 37.

In this connection, the strobe device of the present embodiment is a type in which the reflector is provided inside the strobe holding body, however, it may be allowable that the transmission window portion, which covers the front portion of the reflector, serves as the strobe holding body, too.

The strobe holding body 31 is structured as almost box-like having an opening portion 31a on the front surface side, inside of which an accommodating portion 31b for the reflector 32 or the like, is provided, and electrode enclosing portions 31e and 31f whose front surface sides are respectively opened, which are provided with electrode receiving portions 31g and 31h in the deepest portion, are formed in both side wall portions 31c and 31d on both sides of the accommodating portion 31b. The receiver portion of the present invention is not limited to the shape like as the electrode enclosing portions 31e, and 31f, and the electrode receiving portions 31g, and 31h, however, the slit groove-like or circular arc shape may be allowed.

Further, on the outside surface of the side wall portions 31c and 31d of the strobe holding body 31, engagement protrusions 31i which are positioned vertically in the vicinity of the opening portions of electrode enclosing portions 31e and 31f, and engaged with engagement holes 35a provided on both end portions of the transmission window portion 35, are formed.

In the lower portion of the strobe holding body 31, the first fitting piece 31j which supports approximately the center portion of the electric contact piece 34, and the second fitting piece 31k which supports near a bent portion of the contact piece 34, are provided protrusively. A receiving protrusion 31l is formed on the lower end portion of the first fitting piece 31j, and an engagement protruded piece 31m for the contact piece 34 is formed on the second fitting piece 31k.

Further, on the back side of the strobe holding body 31, an insertion hole 31n for a trigger contact piece 36 is formed.

Figure 2:
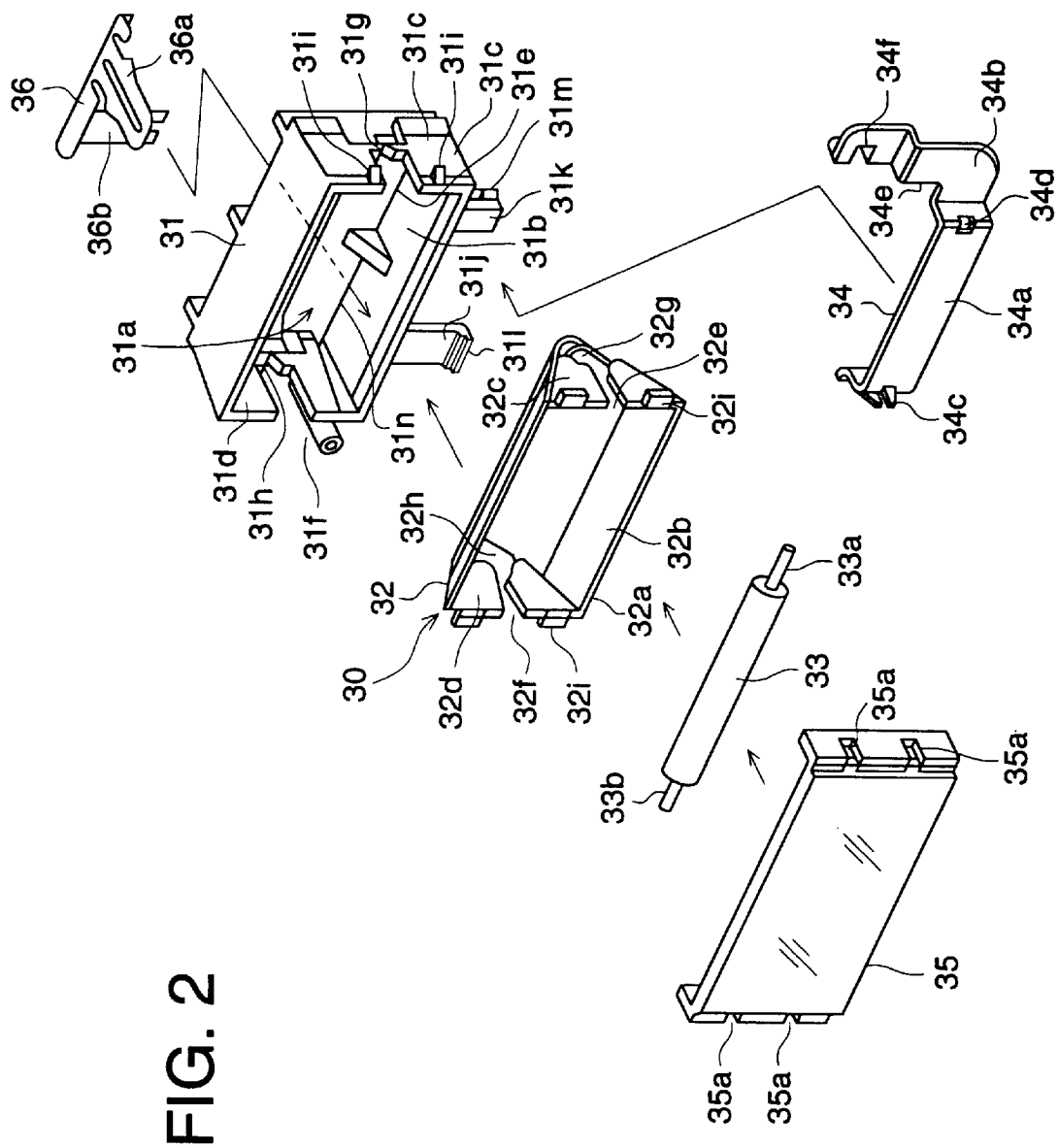
FIG. 2 is an exploded perspective view of a strobe device of Embodiment 1 of the present invention.
Figure 3:
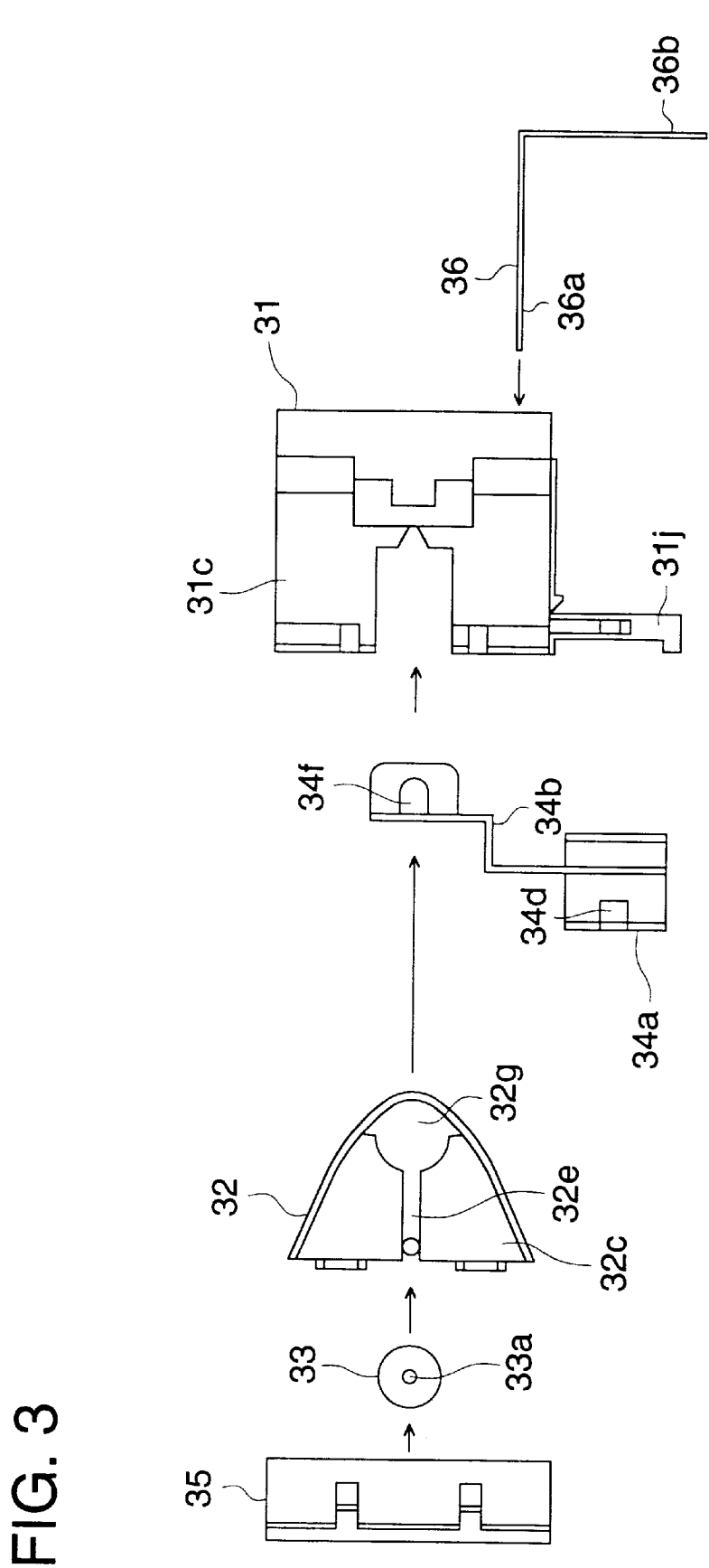
FIG. 3 is an illustration showing a production process of the strobe device of Embodiment 1 of the present invention.

As shown in FIG. 2, the reflector 32 has a reflection portion 32a in which a parabolic reflection surface 32b to reflect the strobe light forward is formed on the inner surface, and a pair of side portions 32c and 32d in which slit grooves 32e and 32f serving as opening portions, and electrode exposure opening portions 32g and 32h are formed at positions respectively corresponding to electrode enclosing portions 31e and 31f. In this connection, the opening portions provided in side portions of the reflector of the present invention may be only slit grooves, or as shown in FIG. 3, a combination of the slit groove and the circular electrode exposure opening portion, or totally circular arc recessed portion, or the state of the side portion having nothing thereon may be the opening portion.

Further, on a pair of side portions 32c and 32d of the reflector 32, total 4 contact tongue-pieces 32i which respectively contact with the end surfaces of the opening portion 31a side on the side wall portions 31c and 31d of the strobe holding body 31, are formed.

The light emitting tube 33 is composed of, for example, a xenon lamp which is formed to be straight tube-like, and has electrode bars 33a and 33b on both end portions.

The contact piece 34 is integrally structured with the C-shaped portion 34a which is horizontally extending in FIG. 2, and a stepped-rising portion 34b, which rises vertically in FIG. 2, and on one bent portion of the C-shaped portion 34a, a connection protruded piece 34c which is connected to the strobe board 37, is provided, and on the other bent portion, an engagement hole portion 34d which is engaged with a connection protruded piece 31m of the strobe holding body 31, is provided. Further, on the stepped-rising portion 34b, a contact angled portion 34e which contacts with a lower end portion on the right side of the strobe holding body 31 in FIG. 2, and an electrode engagement hole 34f which is engaged and contacts with one electrode bar 33a of the light emitting tube 33, are provided.

The trigger contact piece 36 has an insertion piece 36a which is inserted from the back surface side of the strobe holding body 31 into the insertion hole 31n, and a connection portion 36b which is connected with a transformer electrode 37a provided on the strobe board 37 in the lower portion of the back surface side of the strobe holding body 31.

Figure 4:
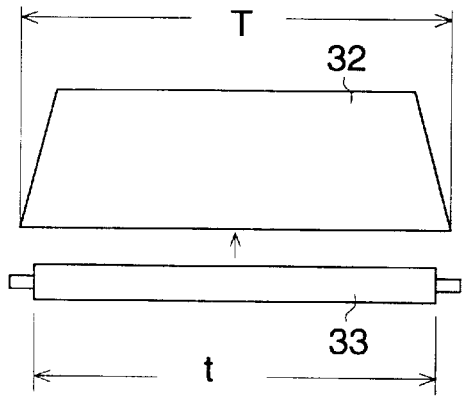
FIG. 4 is an illustration showing a dimensional relationship of a reflector and a light emitting tube in the strobe device of Embodiment 1 of the present invention.

As shown in FIG. 4, when the dimension of the side end portion of the opening of the reflection portion 32a is T, and the tube length of the light emitting tube 33 is t, the reflector 32 is formed to be T>t, and further, the reflection portion 32a is formed into the shape whose dimension is gradually reduced toward the deepest portion, and thereby, when the light emitting tube 33 is inserted into the reflector 32, both ends and electrode bars 33a and 33b of the light emitting tube 33 are exposed to the sides from the deepest portion of the reflection portion 32a.

Next, relating to the production method of the strobe device 30, mainly the case where the reflector 32, light emitting tube 33, electric contact piece 34 and transmission window 35 are assembled into the strobe holding body 31 mainly constituting the light emitting portion of the strobe device, will be described.

Initially, the reflector 32 forming the parabolic reflection surface 32b to reflect the strobe light forward, is inserted from the front surface side of the strobe holding body 31, which has the opening portion 31a in the front surface side, and the accommodating portion 31b in the inside, and in which the electrode enclosing portions 31e and 31f whose front surface sides are opened, are formed in both side wall portions 31c and 31d of the accommodating portion 31b.

The contact piece 34 is attached from the front surface side of the strobe holding body 31.

Further, the engagement hole portion 34d provided on the other bent portion is engaged with the engagement protruded piece 31m of the strobe holding body 31.

Further, the contact angled portion 34e of the stepped-rising portion 34b contacts with the lower end portion of the right side of the strobe holding body 31 in FIG. 2, and the electrode engagement hole 34f faces to the electrode receiving portion 31g of the strobe holding body 31.

Next, the electrode bars 33a and 33b of the light emitting tube 33 are inserted into the deepest portion of the reflector 32 through the slit grooves 32e and 32f, both end portions of the electrode bars 33a and 33b of the light emitting tube 33 are exposed on portions of the electrode exposure opening portions 32g and 32h, and the electrode bars 33a and 33b are engaged with the electrode receiving portions 31g and 31h and positioned, and one electrode bar 33a contacts with the electrode engagement hole 34f.

Next, the transmission window portion 35 is assembled from the front surface side of the strobe holding body 31, and the engagement protruded piece 31i is engaged with the engagement hole 35a.

Further, the insertion piece 36a of the trigger contact piece 36 is inserted into the insertion hole 31n from the back surface side of the strobe holding body 31.

Figure 5:
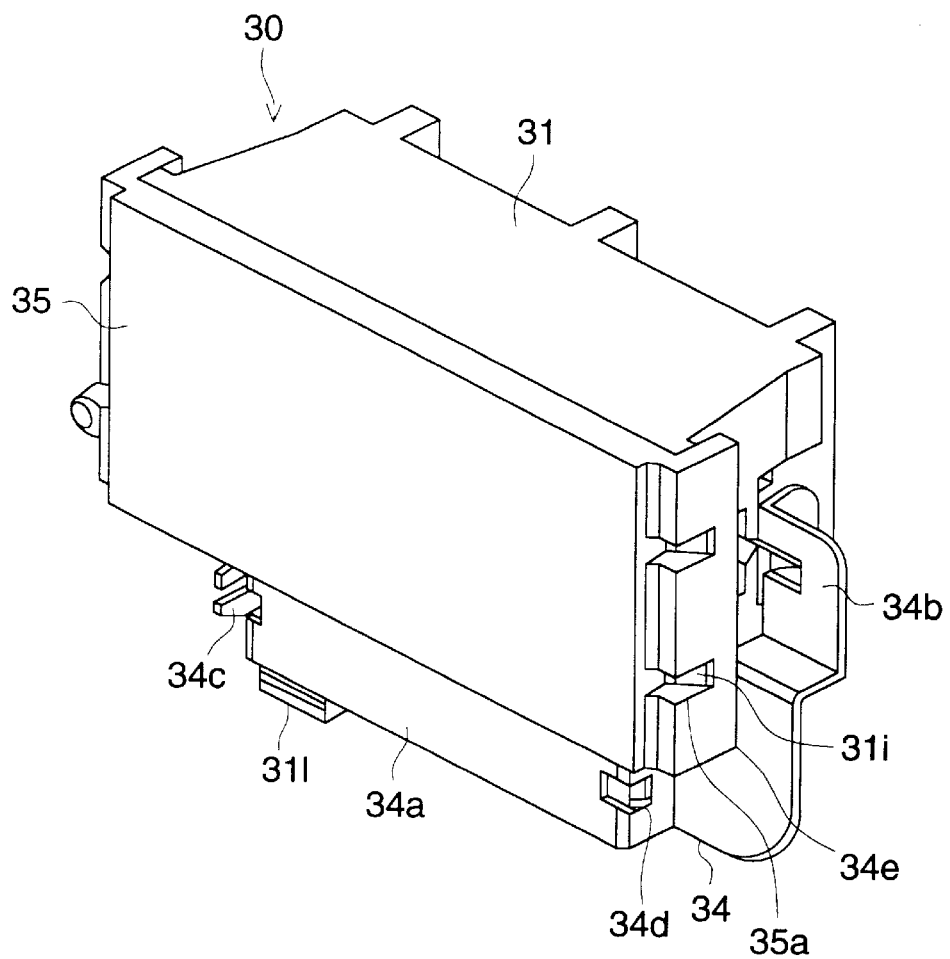
FIG. 5 is a perspective view of the strobe device of Embodiment 1 of the present invention.

The state in which the light emitting portion is structured in this way by assembling the reflector 32, light emitting tube 33, electric contact piece 34, transmission window portion 35, and trigger contact piece 36 into the strobe holding body 31 in the strobe device 30, is shown in FIG. 5.

Then, the connection protruded piece 34c provided on one bent portion of the C-shaped portion 34a of the contact piece 34 of the light emitting portion, is connected to the strobe board 37.

As described above, because all of the reflector 32, light emitting tube 33, electric contact piece 34 and transmission window 35 are assembled into the strobe holding body 31 from the front surface side of its opening portion 31a in the same assembling direction, the strobe device 30, in which the assembling property is excellent, and which is appropriate for mass production, can be provided.

Further, according to the above-described production processes, all of the assembling process of the reflector 32 into the strobe holding body 31, the assembling process of the light emitting tube 33 into the strobe holding body 31, the assembling process of the electric contact piece 34 to the strobe holding body 31, and the assembling process of the transmission window portion 35 onto the opening portion 31a of the strobe holding body 31, can be carried out from the front surface side of the opening portion 31a in the same direction, thereby, a production method in which the assembling property of the strobe device 30 and mass productivity can be increased, can be provided.

Figure 6:
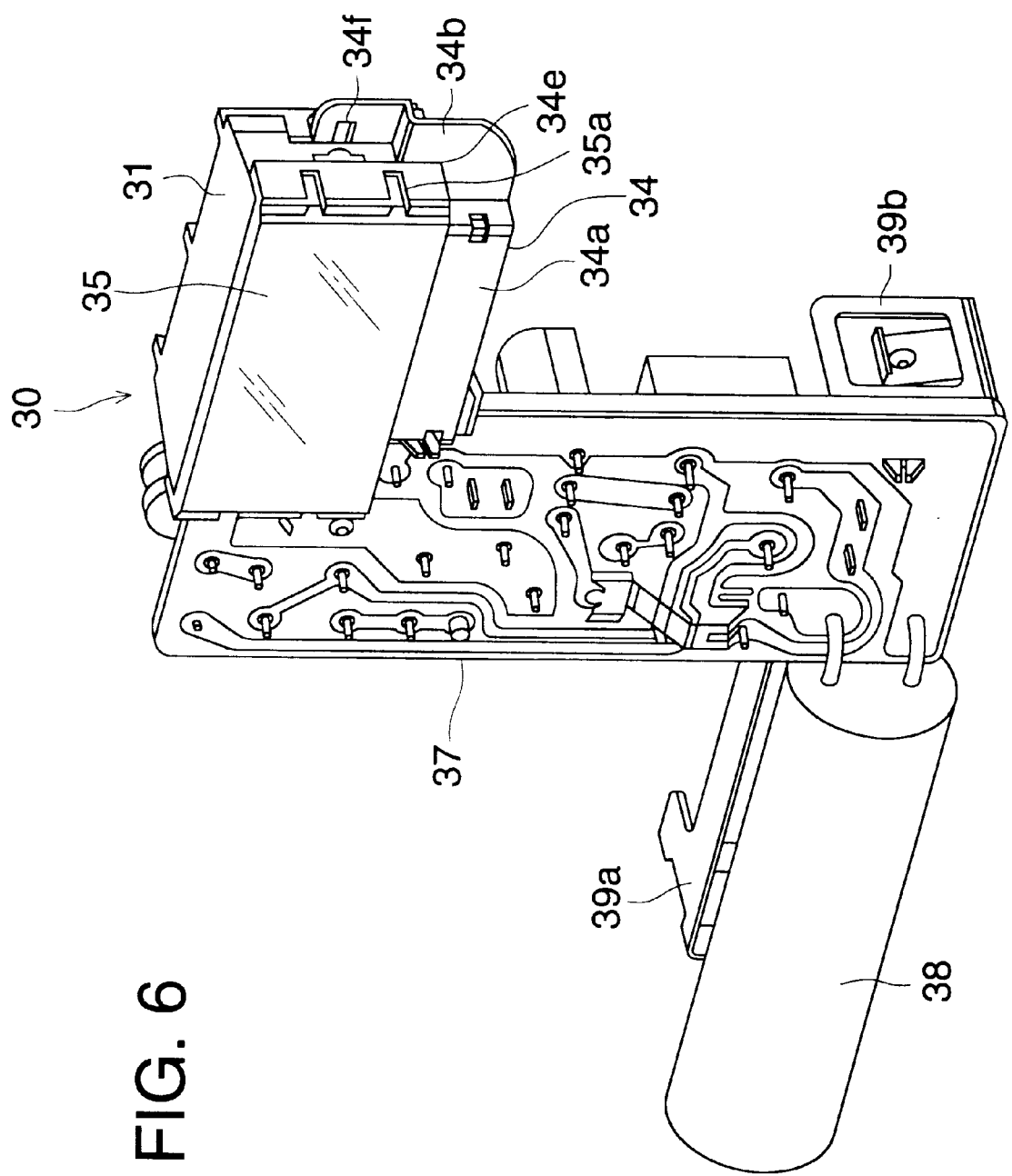
FIG. 6 is a perspective view of the strobe device including a strobe board and a capacitor of Embodiment 1 of the present invention.
Figure 7:
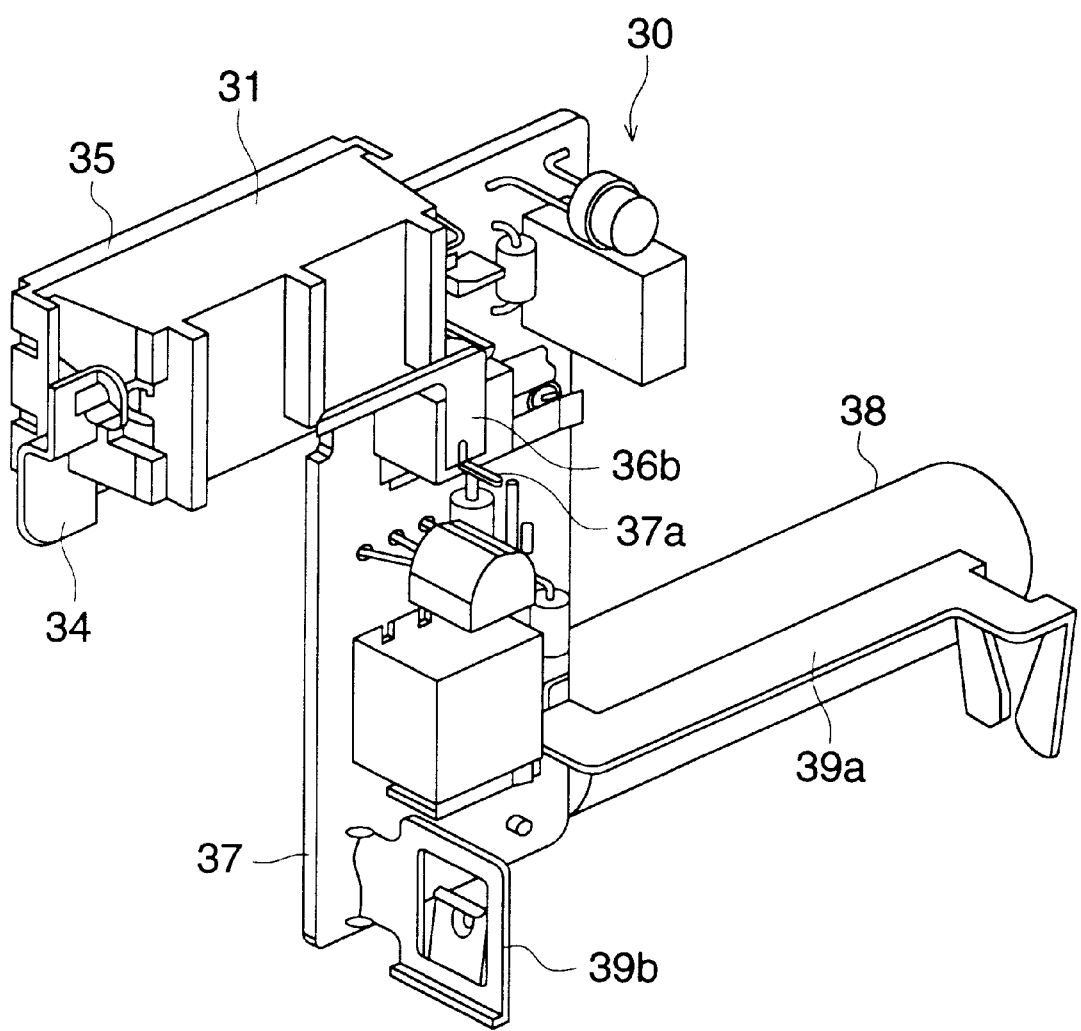
FIG. 7 is a perspective view, viewed from the rear side, of the strobe device including a strobe board and a capacitor of Embodiment 1 of the present invention.
Figure 8:
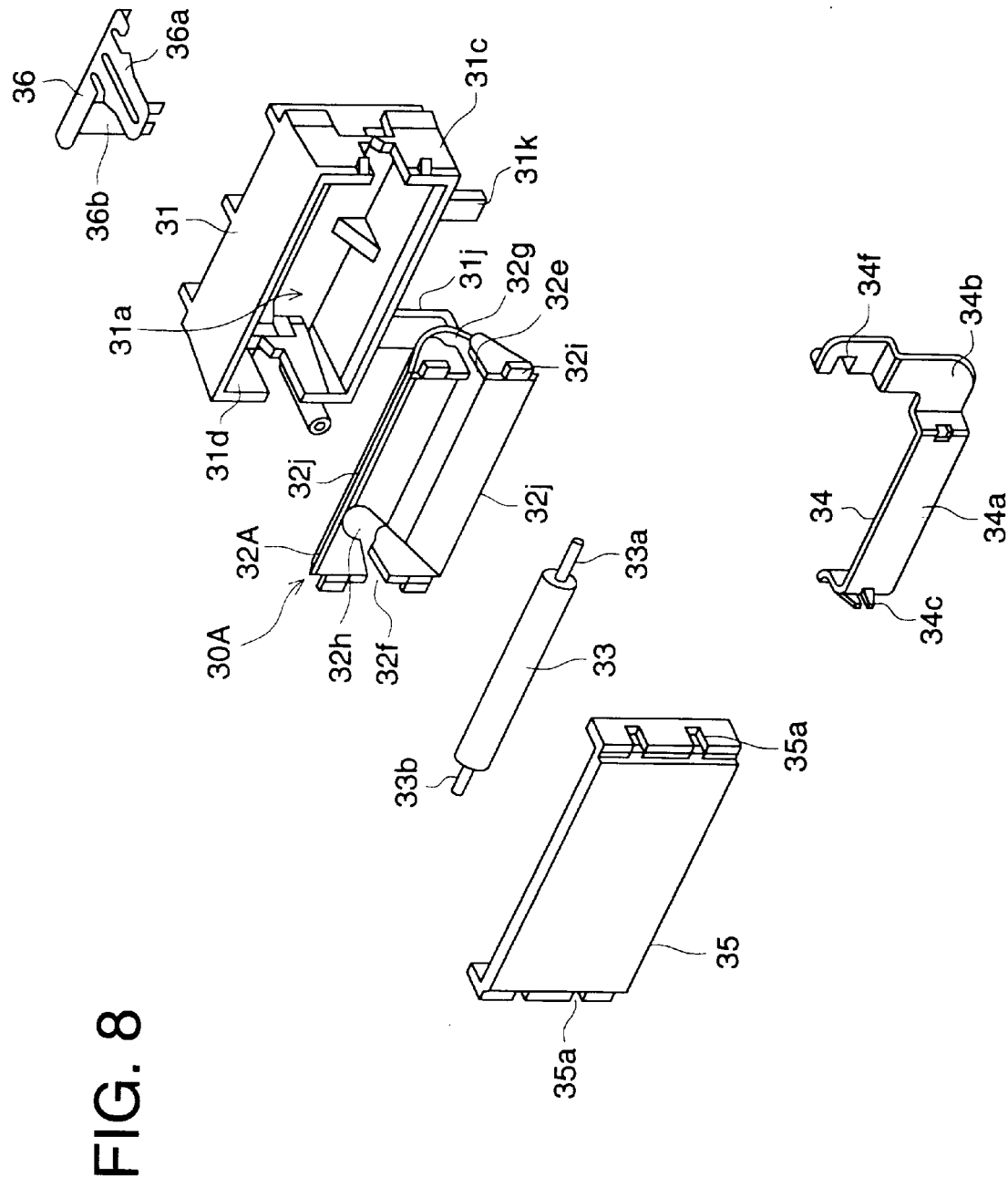
FIG. 8 is an exploded perspective view of a strobe device of Embodiment 2 of the present invention.

FIGS. 6 and 7 show the state in which, on the side portions of the unit including the strobe holding body 31 produced as described above, the strobe board 37, capacitor 38, and battery contact pieces 39a and 39b, are further fitted. On the strobe board 37, circuit elements constituting the strobe circuit, such as semiconductor elements, resistors, capacitors, or the like, are mounted.

Embodiment 2

Next, referring to FIGS. 8 through 11, Embodiment 2 of the present invention will be described.

In the strobe device 30A shown in FIGS. 8 through 11, the same elements as in the strobe device 30 in Embodiment 1 are shown by denoting the same numerical symbols.

Figure 9:
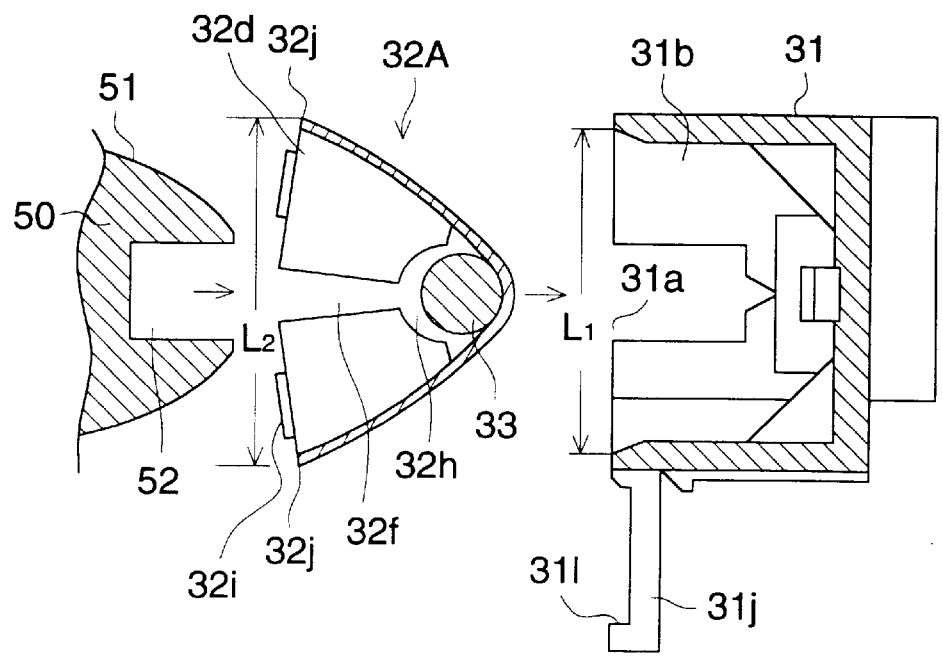
FIG. 9 is a view showing a production process of a strobe device of Embodiment 2 of the present invention.
Figure 10:
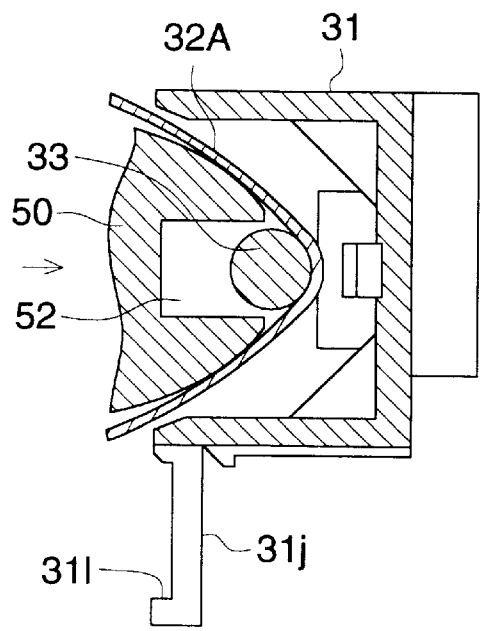
FIG. 10 is a view showing a production process of the strobe device of Embodiment 2 of the present invention.

The basic structure and production method of the strobe device 30A of Embodiment 2 are the same as in the case of Embodiment 1, however, a reflector 32A having the enlargement-opened rim 32j having the dimension L2 larger than the dimension L1 between the upper and the lower opening rims of the strobe holding body 31, is used instead of the reflector 32; and as shown in FIGS. 9 and 10, in the state in which the reflector 32A is enlargedly opened, and slit grooves 32e and 32f which have opening portions, are opened, a process in which the light emitting tube 33 is inserted into the reflector 32A by using a tool 50 provided with a cutout portion 52 to avoid the contact with the bent portion 51 which contacts with the inner surface of the reflector 32A and the light emitting tube 33; and a process in which the reflector 32A is inserted into the strobe holding body 31 from the front surface side of the strobe holding body 31 under the condition that the enlargement-opened rim 32j is bent, are adopted in Embodiment 2, which is a large characteristic feature.

Figure 11:
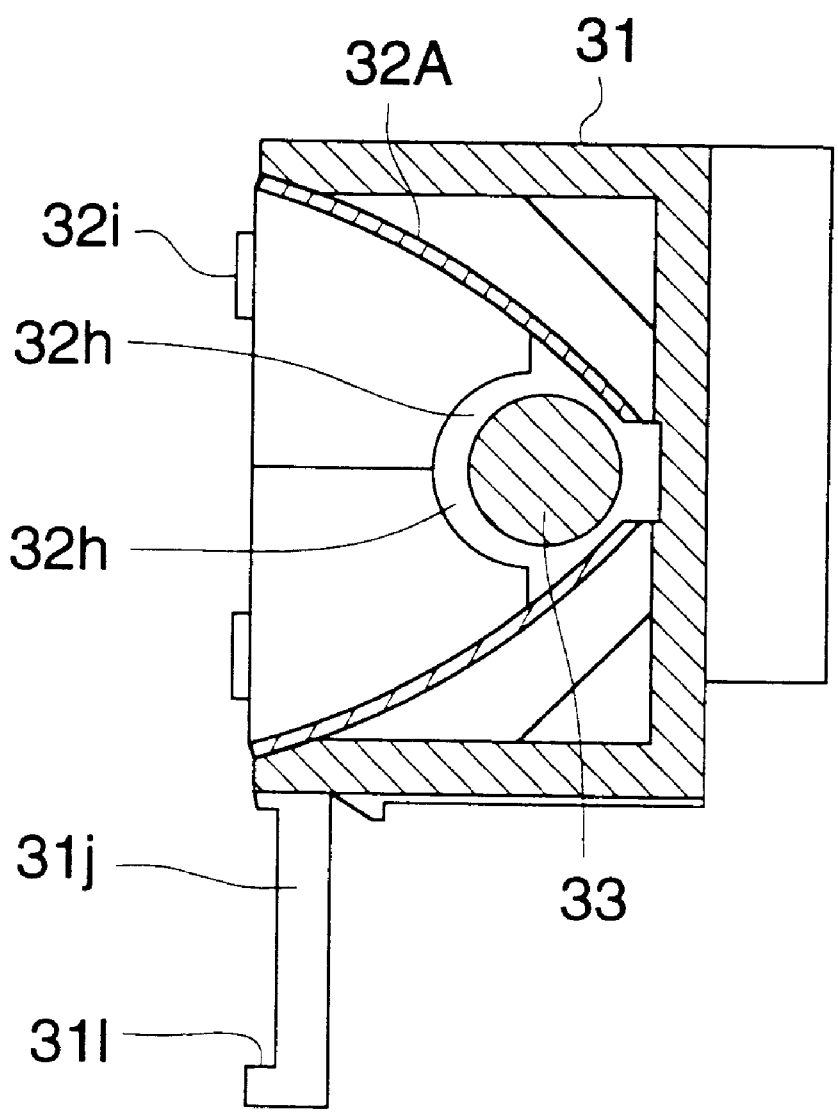
FIG. 11 is a sectional view of the strobe device of Embodiment 2 of the present invention.

FIG. 11 shows the state in which the reflector 32A and light emitting tube 33 are inserted into the strobe holding body 31 from the front surface side of the strobe holding body 31 by using the tool 50.

By also such the strobe device 30A, in the same manner as in the case of the strobe device 30, the effect that the assembling property is excellent and it is appropriate for mass production, can be obtained.

Further, because the reflector 32A is accommodated in the accommodating portion 31a under the condition that the enlargement-opened rim 32j of the reflector 32A is bent, the mounting condition in the strobe holding body 31 can be strengthened by the stress in the enlargedly opened direction in the insertion condition caused in the reflector 32A.

Further, when the reflector 32A is inserted in the strobe holding body 31, the width of slit grooves 32e and 32f is narrowed, thereby, the reflection efficiency of the strobe light on the side surface of the reflector 32A can be increased.

Further, according to also the production method of the strobe device 30A of Embodiment 2 including the production processes using the above-described reflector 32A, all of the assembling process of the reflector 32A into the strobe holding body 31, the assembling process of the light emitting tube 33 into the strobe holding body 31, the assembling process of the electric contact piece 34 to the strobe holding body 31, the assembling process of the transmission window portion 35 onto the opening portion 31a of the strobe holding body 31, can be carried out from the front surface side of the opening portion 31a in the same direction, thereby, a production method in which the assembling property and mass productivity can be increased, can be provided.

The accommodating operation of the reflector 32A into the strobe holding body 31 can be carried out by pushing the reflector 32A into the accommodating portion 31a of the strobe holding body 31 while the enlargement-opened rim 32j of the reflector 32A is being bent, thereby, the processes can be simplified.

Embodiment 3

Next, referring to FIGS. 12 and 13, Embodiment 3 of the present invention will be described.

Figure 12:
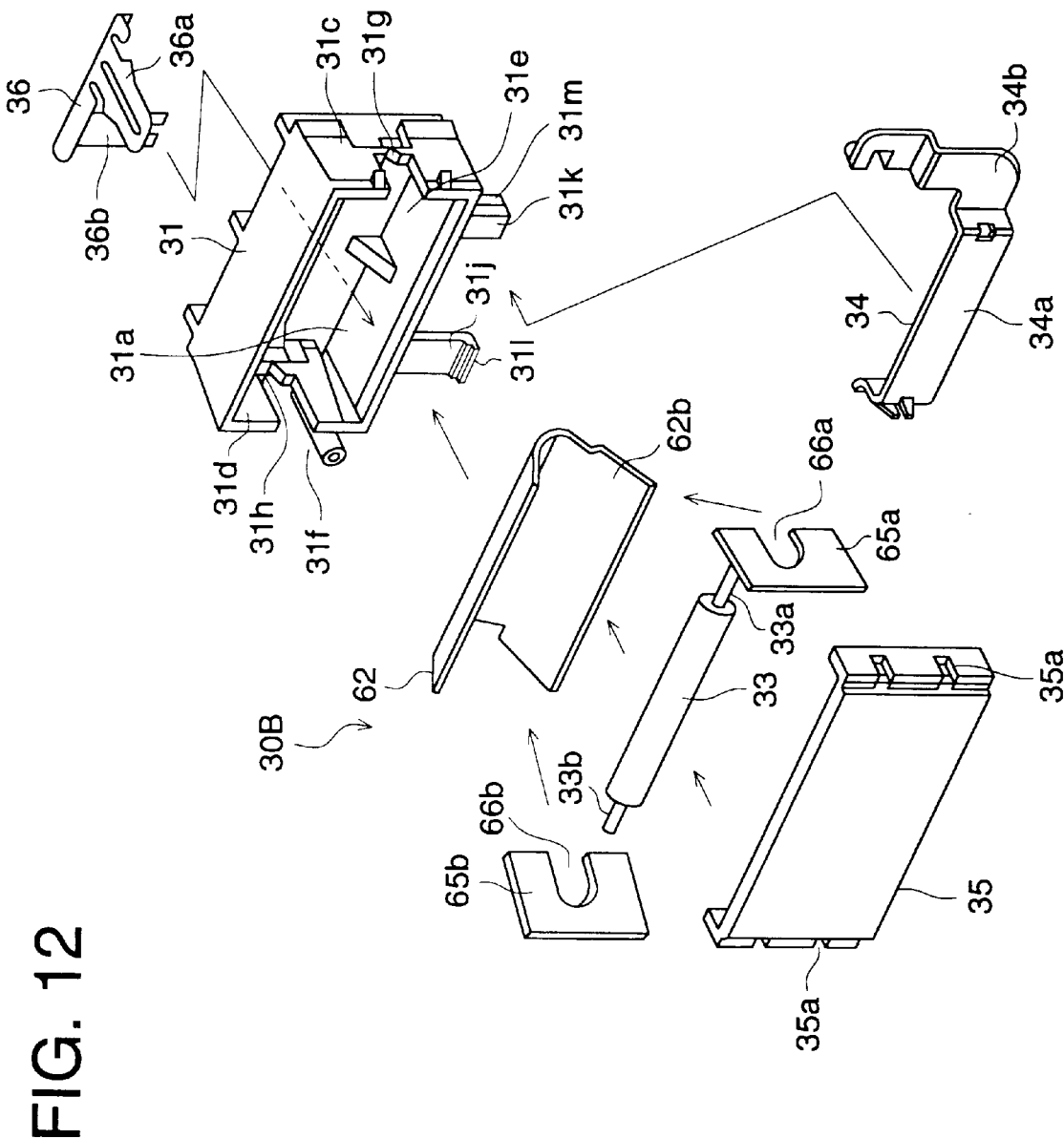
FIG. 12 is an exploded perspective view of a strobe device of Embodiment 3 of the present invention.
Figure 13:
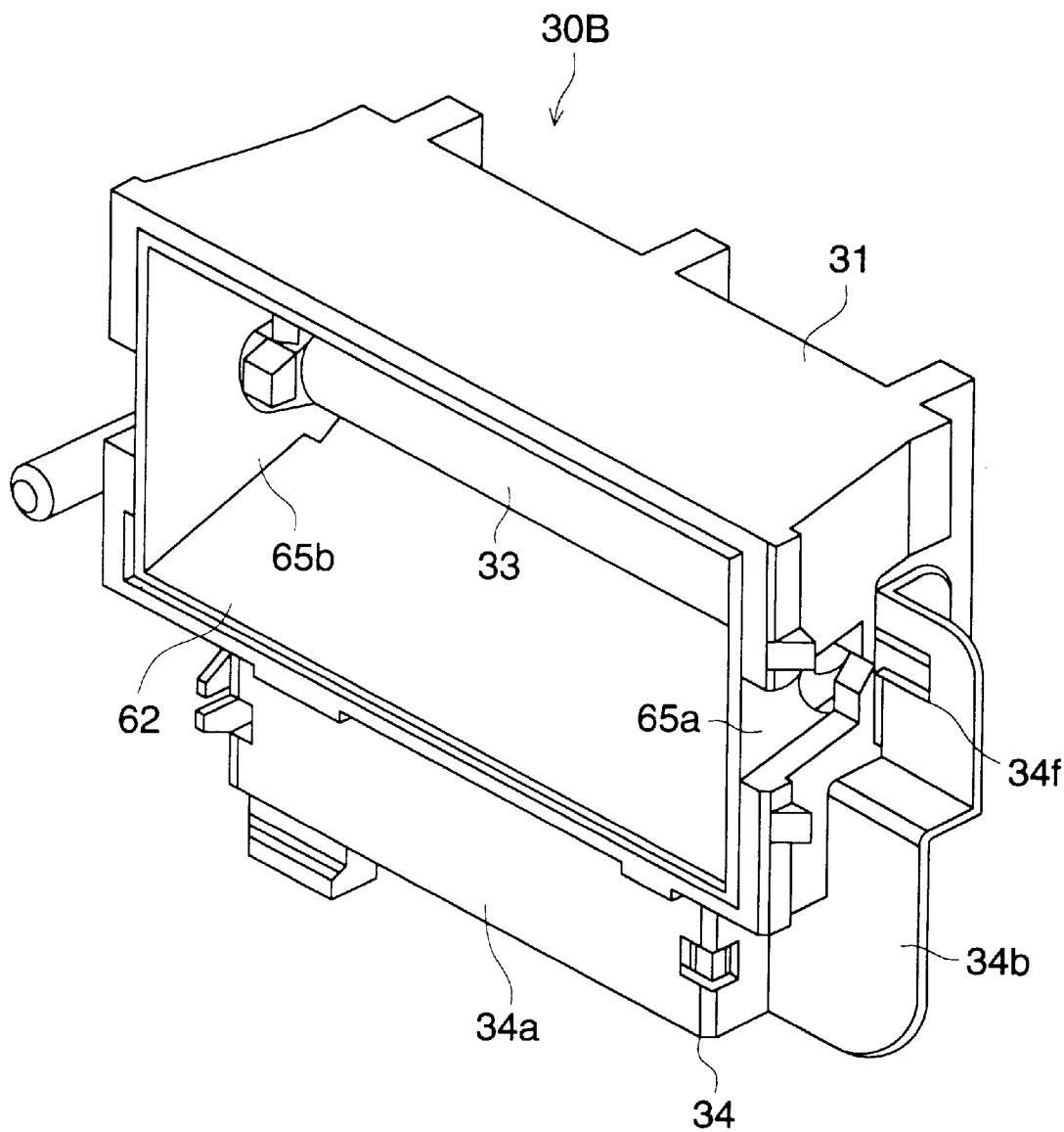
FIG. 13 is a perspective view of the strobe device of Embodiment 3 of the present invention.
Figure 14:
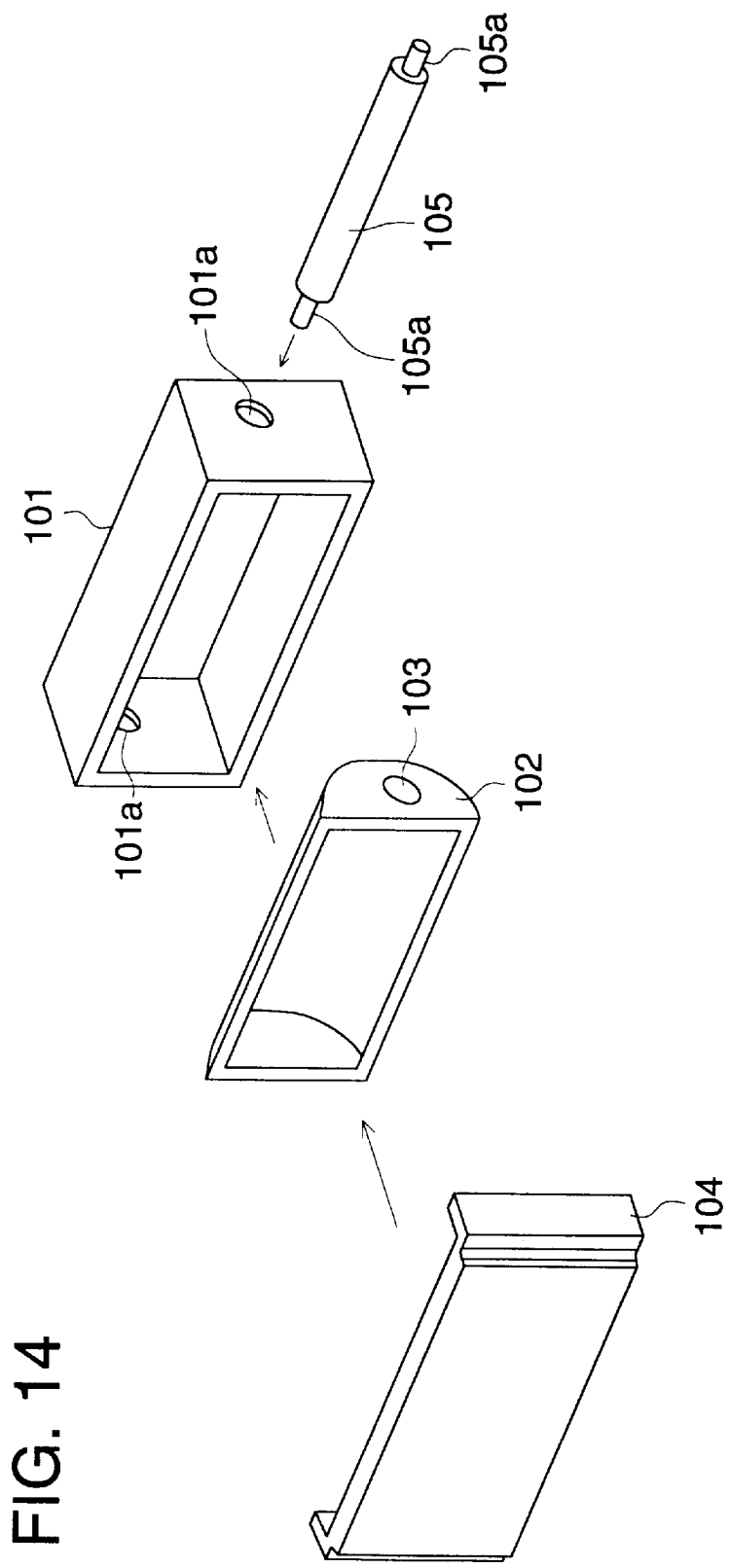
FIG. 14 is a schematic exploded perspective view showing a production process of the conventional strobe device.

In this connection, in a strobe device 30B shown in FIGS. 12 and 13, the same elements as in the strobe device 30 of Embodiment 1 will be shown by denoting the same numerical symbols.

The basic structure and production method of a strobe device 30B of the present Embodiment 3 is almost the same as in the case of Embodiment 1, however, instead of the reflector 32, a reflector 62 which has a parabolic reflection surface 62b to reflect the strobe light forward, and is accommodated in the accommodating portion 31a from the front surface side of the strobe holding body 31; and a pair of side plates 65a and 65b which have recessed grooves 66a and 66b which are recessed portions to expose electrodes 33a and 33b of both ends of the light emitting tube 33, and are inserted into both side portions of the light emitting tube 33 from the front surface side of the strobe holding body 31, are used, which is a characteristic feature. In this connection, the present Embodiment is an example in which the state that the side portion of the reflector has nothing, represents the opening portion.

In the case of this strobe device 30B, the following points are different from Embodiment 1: the reflector 62 having the parabolic reflection surface 62b to reflect the strobe light forward, is inserted from the front surface of the strobe holding body 31; the light emitting tube 33 is inserted into the accommodating portion 31a of the strobe holding body 31 from the front surface side of the reflector 62; electrode portions 33a and 33b on the both ends are engaged with electrode receiving portions 31g and 31h of the strobe holding body 31; a pair of side plates 65a and 65b are inserted into the outside of both side portions of the reflector 62 and the inside of the electrode receiving portions 31g and 31h, from the front surface side of the strobe holding body 31; and electrodes 33a and 33b of the light emitting tube 33 are exposed from the recessed grooves 66a and 66b, and other than the above, the structure and the production method are the same as the case of Embodiment 1.

By such the strobe device 30B also, in the same manner as in the case of the strobe device 30, the effect in which the assembling property is excellent and the device is appropriate for mass production, can be obtained.

In this connection, the pair of side plates 65a and 65b may be structured by one member connected by a connection member.

Further, according to also the production method of the strobe device 30B of Embodiment 3, all of the processes can be carried out from the front surface side of the opening portion 31a in the same direction, thereby, a production method in which the assembling property and mass productivity can be increased, can be provided.

In this connection, in each of Embodiments 1 through 3 described above, electrode bars 33a and 33b of the light emitting tube 33 are engaged with the electrode receiving portions 31g and 31h, however, end portions of the light emitting tube 33 itself may be engaged with the electrode receiving portions 31g and 31h.

Embodiment 4

The following Embodiment is an example in which the pair of side plates are structured by one member connected by a connection member.

Figure 15:
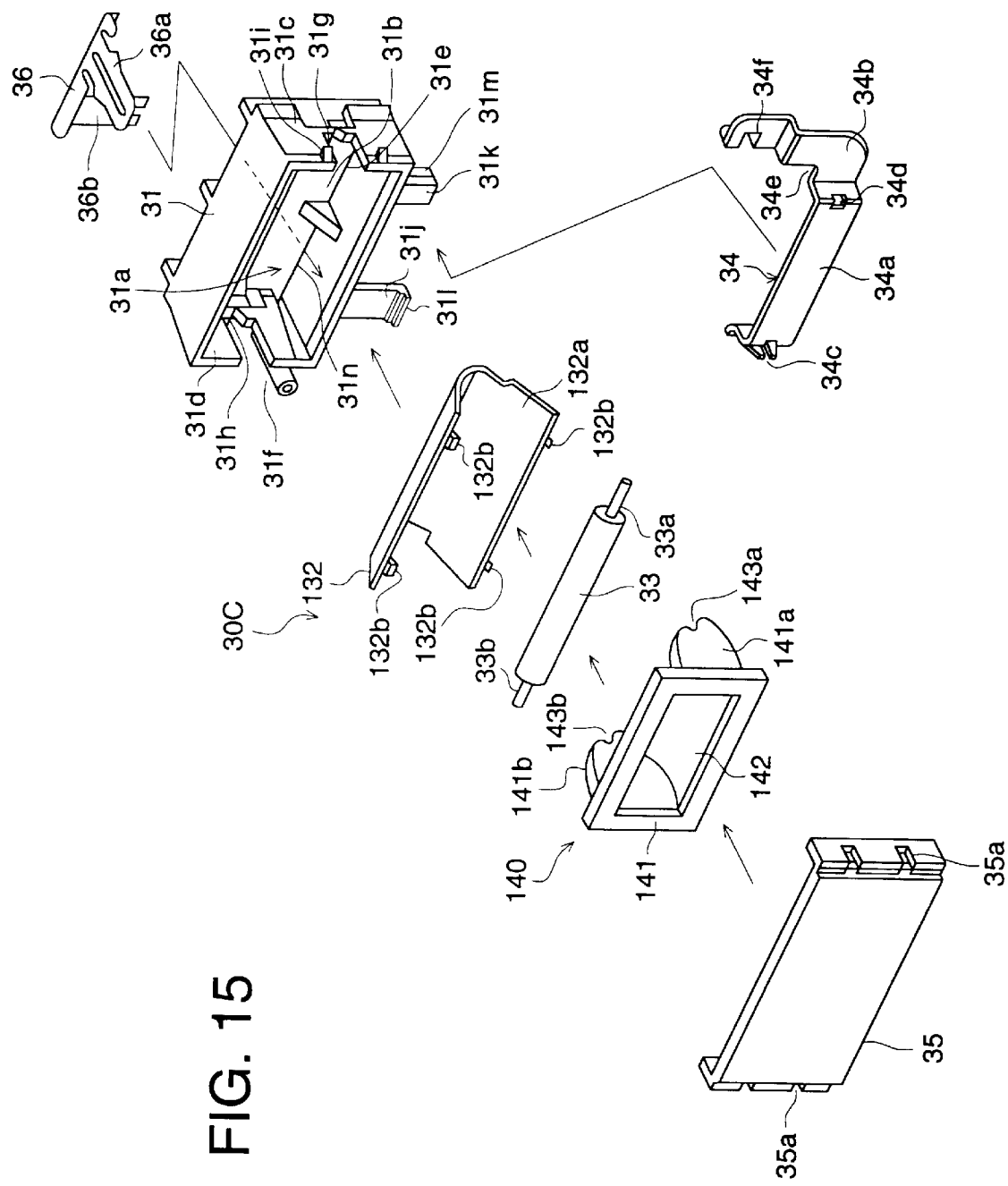
FIG. 15 is an exploded perspective view of a strobe device of Embodiment 4 of the present invention.
Figure 16:
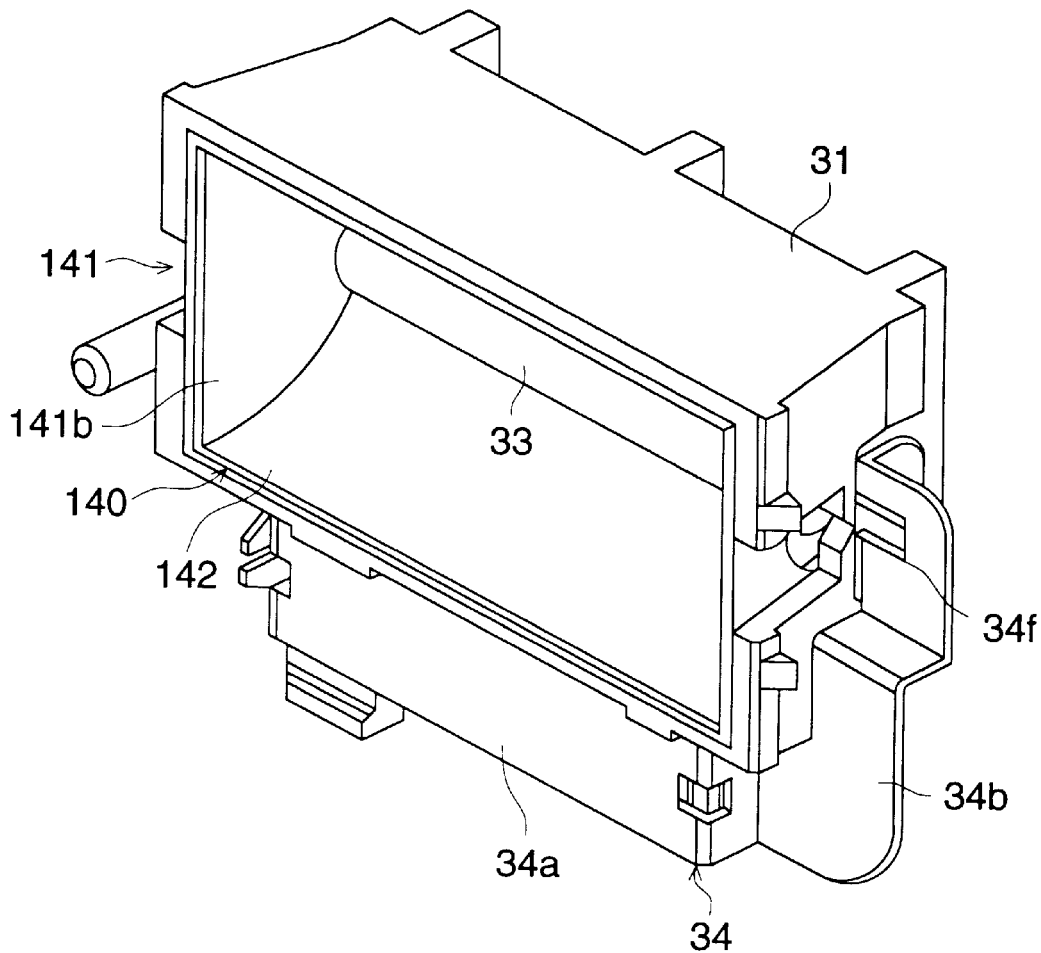
FIG. 16 is a perspective view of a strobe device of Embodiment 4 of the present invention.
Figure 17:
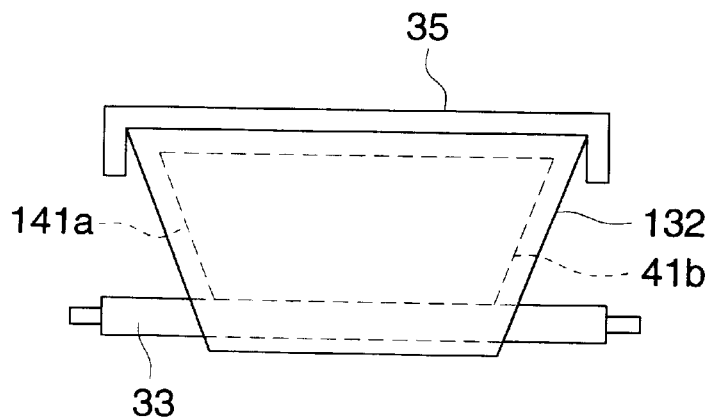
FIG. 17 is an illustration showing a relationship of a reflector and a light emitting tube of the strobe device of Embodiment 4 of the present invention.

Herein, referring to FIGS. 15 through 17, an example of mainly the structure of a light emitting portion unit of the strobe device 30C and its production method will be detailed.

As shown in FIGS. 15 and 16, the light emitting portion unit of the strobe device 30C has the strobe holding body 31, reflector 132, light emitting tube 33, electric contact piece 34, transmission window portion 35 through which the strobe light is transmitted, and which is formed into the shape whose sectional shape shows almost C-shape, trigger contact piece 36 arranged on the rear surface side of the strobe holding body 31, and a light emitting tube holding body 140 which has a rectangular opening portion 142 through which the strobe light transmits, at the central portion of a rectangular holding plate 141, and in which, on both sides of the opening portions 142, a pair of light emitting tube receiving portions 141a and 141b having engagement receiving portions 143a and 143b for the light emitting tube on both protruded ends, are protrusively provided.

The strobe holding body 31 is structured into approximately box-like, which has the opening portion 31a in the front surface side and the accommodating portion 31b for the reflector 132 or the like, in the inside; and electrode enclosing portions 31e and 31f whose front surface sides are opened and in which the electrode receiving portions 31g and 31h are provided in the deepest portion, are formed in the both side wall portions 31c and 31d of the both sides of the accommodating portion 31b.

On the outer surface of side wall portions 31c and 31d of the strobe holding body 31, the engagement protruded pieces 31i which are positioned in the vicinity of the upper and lower portions of the opening portions of the electrode enclosing portions 31e and 31f, and are engaged with the engagement holes 35a provided on both end portions of the transmission window portion 35, are formed.

At the lower portion of the strobe holding body 31, the first fitting piece 31j which supports almost the central portion of the electric contact piece 34, and the second fitting piece 31k which supports near the bent portion of the contact piece 34, are protrusively provided. At the lower end portion of the first fitting piece 31j, the receiving protrusion 31l is formed, and on the second fitting piece 31k, the engagement protruded piece 31m for the contact piece 34 is formed.

Further, the insertion hole 31n for the trigger contact piece 36 is formed on the back surface side of the strobe holding body 31.

The reflector 32 are structured such that a sheet of metallic plate having a mirror surface is structured as the shape of curvature whose side portions are opened, and has a reflection portion 132a in which the parabolic reflection surface to reflect the strobe light forward, is formed on the inner surface, and engagement protruded pieces 132b to engage the reflector 32 with the peripheral portion of the opening portion 142 of the light emitting tube holding body 140.

The light emitting tube 33 is composed of, for example, a xenon lamp which is formed to be straight tube-like, and has electrode bars 33a and 33b on both end portions.

The contact piece 34 is integrally structured with the C-shaped portion 34a which is horizontally extending in FIG. 15, and a stepped-rising portion 34b, which rises vertically in FIG. 15, and on one bent portion of the C-shaped portion 34a, a connection protruded piece 34c which is connected to the strobe board 37, is provided, and on the other bent portion, an engagement hole portion 34d which is engaged with an engagement protruded piece 31m of the strobe holding body 31, is provided.

Further, on the stepped-rising portion 34b, a contact angled portion 34e which contacts with a lower end portion on the right side of the strobe holding body 31, and an electrode engagement hole 34f which is engaged and contacts with one electrode bar 33a of the light emitting tube 33, are provided.

The trigger contact piece 36 has an insertion piece 36a which is inserted from the back surface side of the strobe holding body 31 into the insertion hole 31n, and a connection portion 36b which is connected to a trigger coil provided on the strobe board 37 in the lower portion of the back surface side of the strobe holding body 31.

As shown in FIG. 17, relating to the reflector 132, when the light emitting tube 33 is inserted into the reflector 132, and held by the light emitting tube holding body 40, both ends and electrode bars 33a and 33b of the light emitting tube 33 are exposed to the sides from the deepest portion of the reflection portion 32a.

The light emitting tube holding body 40 is formed of, for example, synthetic resin material which shows white, thereby, the inner surfaces of the pair of light emitting tube receiving pieces 141a and 141b function as auxiliary reflection surfaces to reflect the strobe light.

That is, because the strobe light is reflected by closing the opened side portions of the reflector 32 by the auxiliary reflection surfaces formed by the light emitting tube receiving pieces 141a and 141b in the light emitting tube holding body 40, it is not necessary that the side wall of the reflector is formed by bending of metallic plate which forms the parabolic surface as in the conventional example, thereby, the processing of the reflector 32 can be efficiently performed, and the shape of the parabolic surface can also be the optimum shape without depending on the integrally formed side walls.

Further, the light emitting tube 33 can also be assembled from the front of the reflector 32.

Next, relating to the production method of the light emitting portion unit of the strobe device 30C, the case where the light emitting tube 33 is held by the light emitting tube holding body 140 and assembled into the strobe holding body 31, will be mainly described.

Initially, the light emitting tube 33 is held such that the light emitting tube 33 is nipped between the reflector 132 which forms the parabolic reflection surface to reflect the strobe light forward, and the light emitting tube holding body 140, and in this state, the integrated reflector 132, light emitting tube holding body 140 and light emitting tube 33 are mounted on the front surface side of the strobe holding body 31.

The contact piece 34 is attached from the front surface side of the strobe holding body 31.

That is, the engagement hole portion 34d provided on the other bent portion is engaged with the engagement protruded piece 31m of the strobe holding body 31.

Further, the contact angled portion 34e of the stepped-rising portion 34b contacts with a lower end portion on the right side of the strobe holding body 31, and an electrode engagement hole 34f faces to the electrode receiving portion 31g of the strobe holding body 31.

Next, electrode bars 33a and 33b of the light emitting tube 33 are engaged with the electrode receiving portions 31g and 31h and positioned, and one electrode bar 33a contacts with the electrode engagement hole 34f.

Next, the transmission window portion 35 is assembled from the front surface side of the strobe holding body 31 and the engagement protruded piece 31i is engaged with the engagement hole 35a.

Further, the insertion piece 36a of the trigger contact piece 36 is inserted into the insertion hole 31n from the back surface side of the strobe holding body 31.

As described above, the reflector 132, light emitting tube 33, electric contact piece 34, and trigger contact piece 36 are assembled in the strobe holding body 31 of the strobe device 30C and the light emitting portion unit is structured, and the state of which will be shown in FIG. 16. In FIG. 16, the transmission window portion 35 is omitted.

Then, the connection protruded piece 34c provided on the other bent portion of the C-shaped portion 34a of the contact piece 34 of the light emitting portion unit is connected to the strobe board 37.

As described above, according to Embodiment 4, because the reflector 132, light emitting tube holding body 140, and light emitting tube 33 can be integrated by the operation in one direction, and all of the reflector 132, light emitting tube holding body 140, light emitting tube 33, electric contact piece 34 and transmission window 35 are assembled into the strobe holding body 31 from the front surface side of its opening portion 31a in the same assembling direction, the strobe device 30, in which the assembling property is excellent, and which is appropriate for mass production, can be provided.

Further, according to the above-described production processes, all of the assembling process of the reflector 132, light emitting tube holding body 140, and light emitting tube 33 into the strobe holding body 31, the assembling process of the electric contact piece 34 to the strobe holding body 31, and the assembling process of the transmission window portion 35 onto the opening portion 31a of the strobe holding body 31, can be carried out from the front surface side of the opening portion 31a in the same direction, thereby, a production method in which the assembling property of the strobe device 30 and mass productivity can be increased, can be provided.

Embodiment 5

Next, referring to FIG. 18, Embodiment 5 of the present invention will be described.

Figure 18:
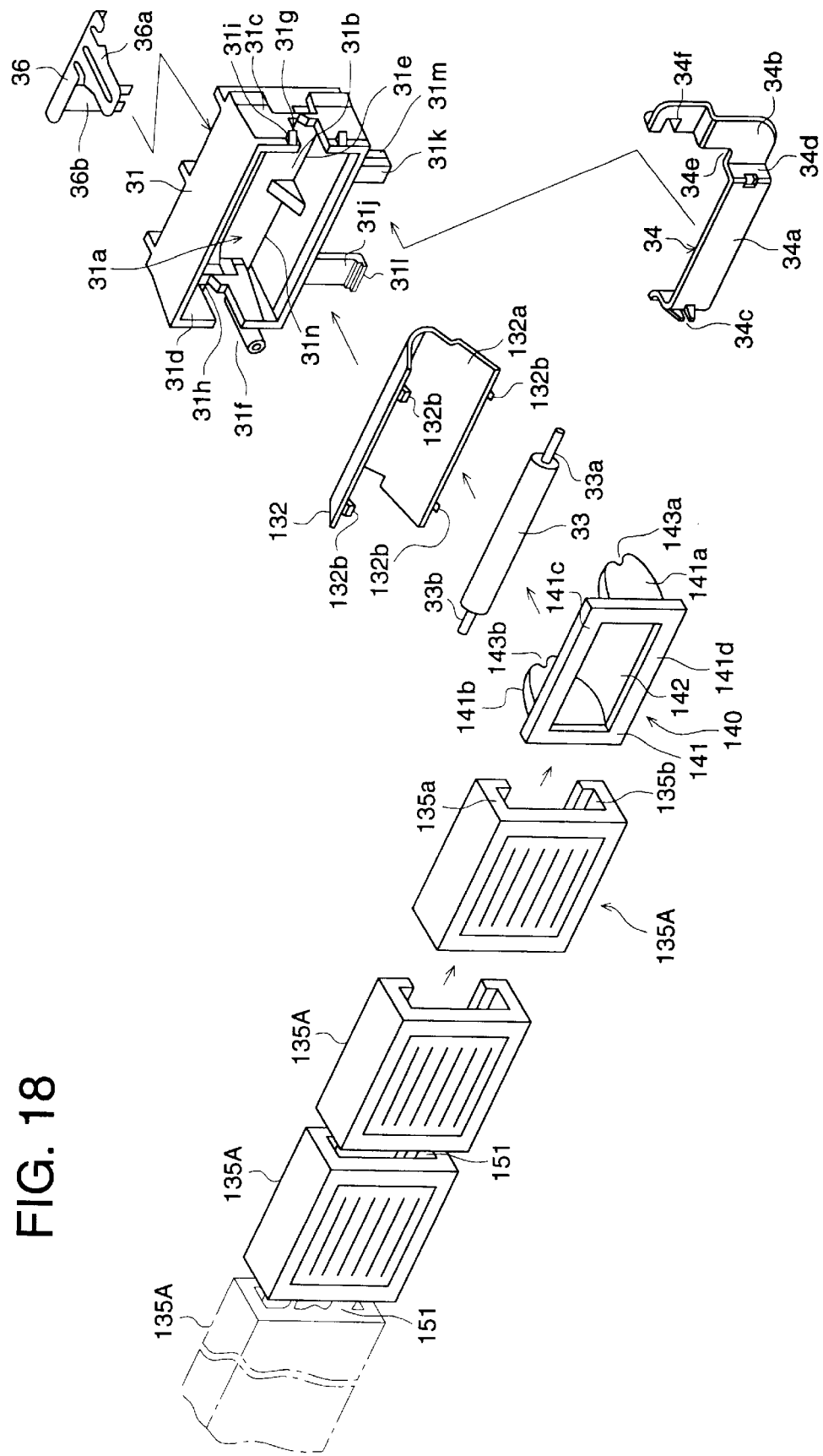
FIG. 18 is an exploded perspective view of a strobe device of Embodiment 5 of the present invention.

In the present Embodiment 5, the production process of the transmission window portion 35 is improved, and as shown in FIG. 18, a large number of transmission window portions 135A are formed in a serial arrangement with easily separable small width connection pieces 151 among them, and when assembling onto the light emitting tube holding body 140, each transmission window portion 135A is individually cut off by bending the connection piece 151 portion, and attached onto the light emitting tube holding body 140.

That is, engagement receiving groove portions 135a and 135b provided both upper and lower side portions of the transmission window portion 135A are respectively engaged with an upper side 141c and a lower side 141d on the upper side and lower side of the opening portion 142 in the holding plate 141 of the light emitting tube holding body 140 slidingly from the side, and the opening portion 142 of the light emitting tube holding body 140 is covered in such a manner that the strobe light can transmit through the opening portion 142.

According to the present Embodiment 5, when the strobe device is mass-produced, the assembly of the transmission window portion 135A onto each light emitting tube holding body 140 can be successively performed effectively, thereby, the mass productivity can be increased.

In this connection, in the above-described Embodiment 4, the electrode bar 33b of the light emitting tube 33 is engaged with the electrode receiving portions 31g and 31h, however, the end portions of the light emitting tube 33 itself may be engaged with the electrode receiving portions 31g and 31h.

The strobe device according to the present invention is suitable to be used with lens-fitted films; however, it is also applicable to use the strobe device with ordinary cameras.

According to the present invention, all of the reflector, light emitting tube and transmission window portion are assembled from the front surface side of the opening portion in the same assembling direction, therefore, a strobe device in which the assembling property is excellent, and which is appropriate for the mass production, can be provided. Further, a strobe device with the constant quality can be provided.

Further, according to the present invention, all of the assembling process of the reflector into the strobe holding body, the assembling process of the light emitting tube into the strobe holding body, and the assembling process of the transmission window portion onto the opening portion of the strobe holding body 31, can be carried out from the front surface side of the opening portion of the strobe holding body in the same direction, thereby, a production method in which the assembling property of the strobe device 30 and mass productivity can be increased, can be provided.

Disclosed embodiment can be varied by a skilled person without departing from the sprit and scope of the invention.

What is claimed is:

1. A strobe device, comprising:
   a reflector, having a reflection surface which reflects a strobe light forwardly;
   a light emitting tube, having an electrode on each end thereof, inside said reflector, said tube adapted to emit said strobe light;
   a transmission window portion provided in a front of said light emitting tube and through which said strobe light is transmitted;
   wherein there is a slit groove on each side portion of said reflector, each said groove being open toward said front, whereby each said electrode extends outside each said side portion.

2. The strobe device of claim 1, comprising:
   a strobe holding body having an opening portion to mount said reflector and receiver portions whose side surface portions are opened toward a front of said receiver portions to mount said light emitting tube from a front of said strobe holding body;
   wherein said reflector is provided inside said strobe holding body; and said light emitting tube is provide inside said reflector so that said electrode portions of said light emitting tube are positioned outside said openings of said reflector and said strobe holding body.

3. The strobe device of claim 2, wherein a dimension of outer rim of an enlarged and opened portion of a front surface is larger than inner rim of said opening portion of said strobe holding body when said reflector is not provided in said strobe holding body, and said reflector is provided inside said strobe holding body under the condition that said reflector is bent.

4. The strobe device of claim 3, wherein said openings of said reflector have a slit groove and an electrode exposure opening portion; said slit groove is closed when said reflector is provided inside said strobe holding body under the condition that said reflector is bent; and said light emitting tube is provided inside said reflector so that said electrode portion is positioned outside said electrode exposure opening portion of said reflector and said receiver portion of said strobe holding body.

5. The strobe device of claim 1, comprising:
   a side plate having a recessed portion to cover at least a portion of said openings of said reflector;
   wherein said light emitting tube is provided inside said reflector so that said electrode portions of said light emitting tube are positioned outside said recessed portions of said side plate.

6. A lens-fitted film unit, comprising the strobe device of claim 1.

7. A lens-fitted film unit, comprising the strobe device of claim 1.

8. A strobe device, comprising:
   a strobe holding body having an opening portion on a front side and receiver portions on side surface portions, said receiver portions being open toward a front of said side surface portions;

a reflector, within said strobe holding body, having a reflection surface for reflecting strobe light forwardly, there being an opening on each side portion thereof;

a light emitting tube, having an electrode on each end thereof, for emitting said strobe light, said light emitting tube being inside said reflector so that each said electrode extends outside each said opening of said reflector and said receiver portions of said strobe holding body; and a transmission window portion provided on said opening portion of said strobe holding body through which said strobe light is transmitted.

9. The strobe device of claim 8, wherein said openings of said reflector has a slit groove.

10. The strobe device of claim 8, wherein a dimension of outer rim of an enlarged and opened portion of a front surface is larger than inner rim of said opening portion of said strobe holding body when said reflector is not provided in said strobe holding body, and said reflector is provided inside the strobe holding body under the condition that said reflector is bent.

11. The strobe device of claim 8, wherein said openings of said reflector have a slit groove and an electrode exposure opening portion; said slit groove is closed when said reflector is provided inside said strobe holding body under the condition that said reflector is bent; and said light emitting tube is provided inside said reflector so that said electrode portion is positioned outside said electrode exposure opening portion of said reflector and said receiver portion of said strobe holding body.

12. The strobe device of claim 8, comprising:

a side plate having a recessed portion to cover at least a portion of said openings of said reflector;

wherein said light emitting tube is provided inside said reflector so that said electrode portions of said light emitting tube are positioned outside said recessed portions of said side plate and said strobe holding body.

13. A lens-fitted film unit, comprising the strobe device of claim 8.

14. A method of producing a strobe device comprising mounting a light emitting tube inside a reflector from a front of said reflector, said tube having an electrode on each end thereof, said tube adapted to emit strobe light, said reflector having a reflection surface for reflecting said strobe light forwardly, an opening on each side portion of said reflector, mounting a transmission window portion, through which said strobe light is transmitted, on a front surface of said reflector, each said electrode is located so that it extends at least partly outside one said opening of said reflector.

15. A method of producing a strobe device comprising mounting a light emitting tube inside a reflector from a front of said reflector, said tube having an electrode on each end thereof, said tube adapted to emit strobe light, said reflector having a reflection surface for reflecting said strobe light forwardly, an opening on each side portion of said reflector, mounting said reflector inside a strobe holding body from a front of said body, said body having an opening portion in a front side thereof, said body having receiver portions including side surface portions which are open toward a front of said receiver portions;

mounting a transmission window portion, through which said strobe light is transmitted, on said opening portion of said strobe holding body, each said electrode extending at least partly outside one said opening of said reflector.

16. The method of claim 15 wherein each said opening of said reflector has a slit groove comprising mounting said light emitting tube inside said reflector from a front of said reflector after mounting said reflector inside said strobe holding body from a front of said strobe holding body;

mounting said transmission window portion in said opening portion of said strobe holding body after mounting said light emitting tube;

wherein said light emitting tube is mounted inside said reflector from the front of said reflector through each said opening of said reflector and said receiver portions of said strobe holding body.

17. The method of claim 15 comprising mounting said light emitting tube inside said reflector from the front of said reflector after mounting said reflector inside said strobe holding body from the front of said strobe holding body;

mounting a side plate on said strobe holding body from a front thereof after the step of mounting said light emitting tube, said side plate having a recessed portion to cover at least a part of each said opening portion of said strobe holding body;

mounting said transmission window portion in said opening portion of said strobe holding body after mounting said side plate;

wherein said light emitting tube is mounted in said reflector through each said opening of said reflector and through said receiver portions of said strobe holding body; each said electrode of said light emitting tube extends outside said recessed portions of said side plate.

18. The method of claim 15 wherein a dimension of an outer rim of an enlarged and opened portion of a front surface is larger than an inner rim of said opening portion when said reflector is not in said strobe holding body; said opening of said reflector having a slit groove and an electrode exposure opening portion; said method comprising mounting said reflector inside said strobe holding body from a front of said strobe holding body after mounting said light emitting tube inside said reflector from a front of said reflector;

wherein said reflector inside said strobe holding body is bent; said slit groove is closed when said reflector is bent.

19. The method of claim 15 wherein mounting said reflector inside said strobe holding body is executed by use of a tool having a cutout portion to avoid a contact with said light emitting tube.

20. A strobe device, comprising:

a reflector, having a reflection surface which reflects a strobe light forwardly and an opening on each side of said reflector;

a light emitting tube, having an electrode on each end thereof and located inside said reflector, said tube emitting said strobe light; and a transmission window portion provided in a front of said light emitting tube and adapted to transmit said strobe light;

a side plate on each said opening on each sides of said reflector;

wherein each said side plate has an opening which is opened toward a rear of said side plates;

and said light emitting tube is inside said reflector so that each said electrode is outside one said opening.

* * * * *